(12) United States Patent
Yang et al.

(10) Patent No.: US 7,782,546 B1
(45) Date of Patent: Aug. 24, 2010

(54) ZOOM LENS HAVING INCREASED POSITIONING ACCURACY

(75) Inventors: Ming-Chyi Yang, Taichung (TW); Chang-Hung Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/503,927

(22) Filed: Jul. 16, 2009

(30) Foreign Application Priority Data

Feb. 23, 2009 (TW) ............................... 98105639 A

(51) Int. Cl.
*G02B 15/22* (2006.01)
(52) U.S. Cl. ................. 359/693; 359/676; 359/694; 359/699; 359/700; 359/701; 359/822; 359/829; 359/830; 396/72
(58) Field of Classification Search ................. 359/676, 359/693, 694, 699–701, 822–826, 829, 830; 396/72–88
See application file for complete search history.

(56) References Cited

U.S. PATENT DOCUMENTS

| 6,339,681 | B1 * | 1/2002 | Takeshita ..................... 396/79 |
| 7,031,604 | B2 * | 4/2006 | Nomura ....................... 359/699 |
| 2004/0141736 | A1 * | 7/2004 | Nomura ....................... 396/72 |
| 2006/0034594 | A1 * | 2/2006 | Yumiki et al. ................. 396/72 |
| 2006/0078322 | A1 * | 4/2006 | Nomura ....................... 396/73 |
| 2006/0159438 | A1 * | 7/2006 | Kobayashi ................... 396/79 |
| 2006/0182432 | A1 * | 8/2006 | Yumiki ........................ 396/72 |
| 2007/0242940 | A1 * | 10/2007 | Yumiki et al. ................. 396/79 |

FOREIGN PATENT DOCUMENTS

TW 200742924 11/2007

OTHER PUBLICATIONS

English abstract of TW200742924.

\* cited by examiner

*Primary Examiner*—Evelyn A. Lester
(74) *Attorney, Agent, or Firm*—Thomas, Kayden, Horstemeyer & Risley

(57) ABSTRACT

A zoom lens includes a cam roll, straight-forward units, lens groups, a driving unit, a detecting unit and a micro-processing unit. The lens groups moved by the cam roll sequentially varies from a receiving status to a zeroing status, a macro shooting-distance status and a wide shooting-distance status. A datum point of the cam roll corresponds to the zeroing status of the lens groups. The detecting unit includes an impeller, a detecting portion and a photonic sensor. When the photonic sensor detects the datum point of the cam roll, the micro-processing unit determines the position of the datum point of the cam roll and to reset the rotation count of the impeller. When the photonic sensor detects a skew point of the cam roll, the micro-processing unit determines and amends the rotation count of the impeller to be equal to a predetermined value.

12 Claims, 13 Drawing Sheets

ZOOM LENS HAVING INCREASED POSITIONING ACCURACY

CROSS REFERENCE TO RELATED APPLICATIONS

This Application claims priority of Taiwan Patent Application No. 98105639, filed on Feb. 23, 2009, the entirety of which is incorporated by reference herein.

BACKGROUND OF THE INVENTION

1. Field of the Invention

The present invention relates to a lens, and in particular relates to a zoom lens having increased positioning accuracy.

2. Description of the Related Art

Referring to FIGS. 1 to 3, Taiwan Application No. 95116393 discloses a lens configuration which includes a lens 8 retractable along an axial line L and a control system 90 controlling the lens 8.

The lens 8 includes a base 81, a guide roll 82 rotatably jacketed inside the base 81, an inner roll 83 disposed in and rotated relative to the guide roll 82, a lens chamber unit 84 disposed in the guide roll 82 and rotated/moved relative to the inner roll 83, and a driving unit 85 utilized to perform extension/retraction movements of the lens 8. The driving unit 85 includes a motor 851 disposed on the base 81 and a decelerating gear system 852 operatively connected to the motor 851 and the guide roll 82.

The control system 90 includes a position detection unit 91, a zero detection unit 92, a micro-processing unit 93 connected to the position detection unit 91 and the zero detection unit 92, and a motor control unit 94 connected to the micro-processing unit 93 and the motor 851. The position detection unit 91 includes an impeller 911 disposed on the base 81 and rotationally driven by the motor 851 and a first induction element 912 disposed on the base 81 capable of sensing the rotation of the impeller 911. The zero detection unit 92 includes a reflective sheet 921 attached to the outside of the guide roll 82 and a second induction element 922 disposed on the base 81 capable of sensing the reflective sheet 921.

When the lens 8 controlled by the control system 90 is extended or retracted to perform the zooming process to cause the second induction element 922 to sense the reflective sheet 921, a zero point signal outputted from the second induction element 922 is provided for the micro-processing unit 93 to determine the position of the zero point and to reset the rotation count of the impeller 911. When the motor 851 keeps rotating, the rotation of the impeller 911 can be sensed by the first induction element 912, and a rotation signal can be provided for the micro-processing unit 93 to determine the rotation count of the impeller 911 for obtaining an extended position of the lens 8.

During the zooming process of the lens 8, the extended position of the lens 8 can be calculated by the rotation count of the impeller 911 after the zero point is determined by the micro-processing unit 93. Due to the improper motion of the impeller 911 during the zooming process, the rotation count sensed by the first induction element 912 cannot be accurately calculated, and the actual extension/retraction position of the lens 8 cannot be accurately controlled by the micro-processing unit 93. In particular, when the variation of the focus range of the lens 8 is large or the frequency of the reciprocal extension/retraction of the lens 8 during the zooming process is high, the accumulated error due to the rotation count of the impeller 911 will affect the positioning accuracy of the lens 8.

BRIEF SUMMARY OF THE INVENTION

Therefore, the purpose of the invention is to provide a zoom lens having increased positioning accuracy.

The zoom lens having increased positioning accuracy of the invention comprises a base, a cam roll, a plurality of straight-forward units, a plurality of lens groups, a driving unit, a detecting unit and a micro-processing unit. The cam roll, rotatable about an optical axis at an original position thereof and disposed on the base, comprises a plurality of cam grooves, a datum point disposed along a circular direction, and at least one skew point. The plurality of straight-forward units are respectively parallel to the optical axis and fixed at the base. The plurality of lens groups are moved by the cam roll to sequentially vary from a receiving status to a zeroing status, a macro shooting-distance status and a wide shooting-distance status. Each of the plurality of lens groups, jacketed on one of the plurality of straight-forward units and driven by one of the plurality of cam grooves of the cam roll, comprises a group box movable along a direction of the optical axis and at least one lens securely disposed on the group box. The datum point of the cam roll corresponds to the zeroing status of the plurality of lens groups, and a position of the skew point is configured as a skewing status corresponding to a duration between the macro shooting-distance status and the wide shooting-distance status of the plurality of lens groups. The driving unit installed on the base comprises a driving portion and a decelerating system driven by the driving portion. The driving portion drives the cam roll to be rotatable at the original position thereof, so that the plurality of lens groups are reciprocally switched between the receiving status and the wide shooting-distance status. The detecting unit disposed on the base comprises an impeller driven by the driving portion of the driving unit, a detecting portion utilized to detect the rotation of the impeller with a rotation count, and a photonic sensor utilized to detect the datum point and the at least one skew point of the cam roll. The micro-processing unit is electrically connected to the driving unit and the detecting portion and the photonic sensor of the detecting unit. When the photonic sensor of the detecting unit detects the datum point of the cam roll, a signal emitting from the photonic sensor of the detecting unit is provided for the micro-processing unit to determine the position of the datum point of the cam roll and zero the rotation count of the impeller. When the photonic sensor of the detecting unit detects the at least one skew point of the cam roll, a skew signal emitting from the photonic sensor of the detecting unit is provided for the micro-processing unit to determine whether the rotation count of the impeller meets a predetermined value or not, and the micro-processing unit amends the rotation count of the impeller to be equal to the predetermined value if the rotation count of the impeller is not equal to the predetermined value.

With the installation of the skew points, the rotation count of the impeller can be skewed and amended by the micro-processing unit during the zooming process of the lens, thereby assuring accurate movement of the lens groups to correct positions, thus increasing positioning accuracy.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
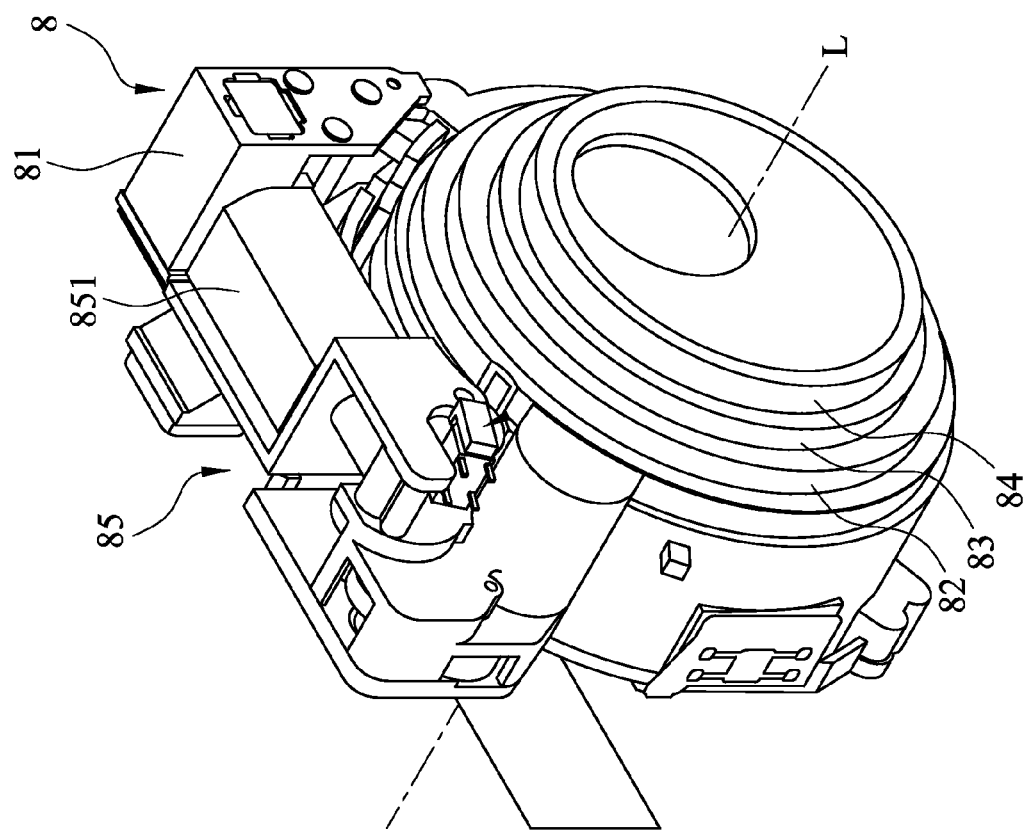
FIG. 1 is a perspective view of a lens situated at a zeroing position of Taiwan Application No. 95116393.
Figure 2:
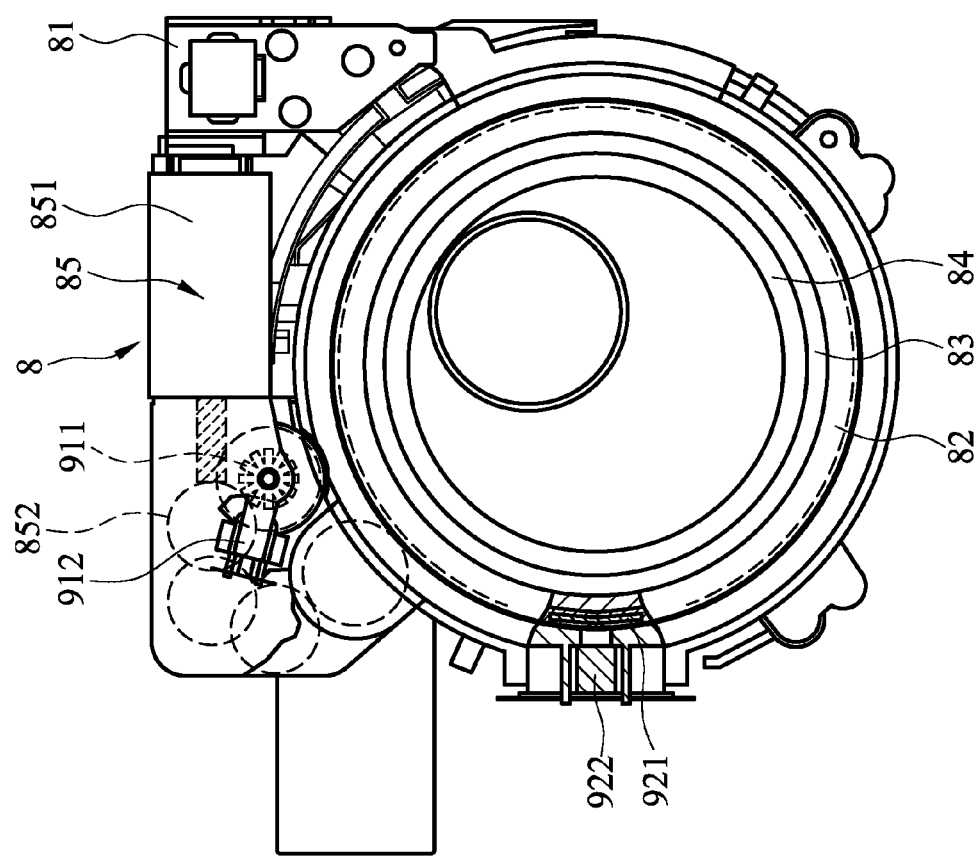
FIG. 2 is a front view showing the lens situated at the zeroing position of FIG. 1.
Figure 3:
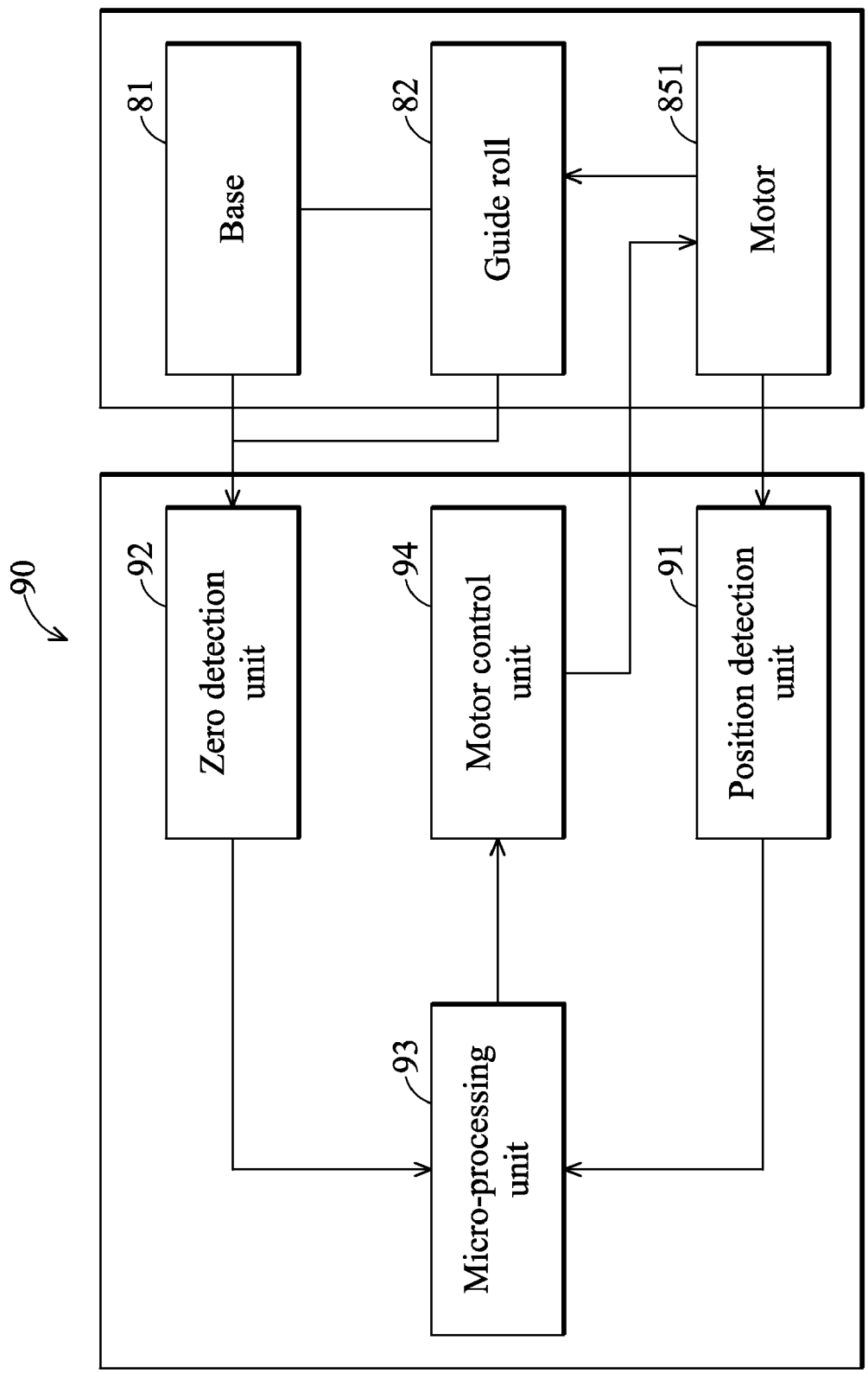
FIG. 3 shows a configuration of a control system utilized for controlling extension/retraction of the lens.

The following description is of the best-contemplated mode of carrying out the invention. This description is made for the purpose of illustrating the general principles of the invention and should not be taken in a limiting sense. The scope of the invention is best determined by reference to the appended claims.

Referring FIGS. 4 to 6 and 9, a zoom lens having increased positioning accuracy of a preferred embodiment of the invention is provided, wherein an optical zooming rate of the zoom lens is not less than 12 times. The zoom lens comprises a base 1, a cam roll 2, a plurality of straight-forward units 31, 32, 33 and 34, a plurality of lens groups 41, 42, 43 and 44, a driving unit 5, a detecting unit 6 and a micro-processing unit 7. As shown in FIGS. 10-13, the lens groups 41, 42, 43 and 44 are moved by the cam roll 2 to sequentially vary from a receiving status to a zeroing status, a macro shooting-distance status and a wide shooting-distance status.

Figure 5:
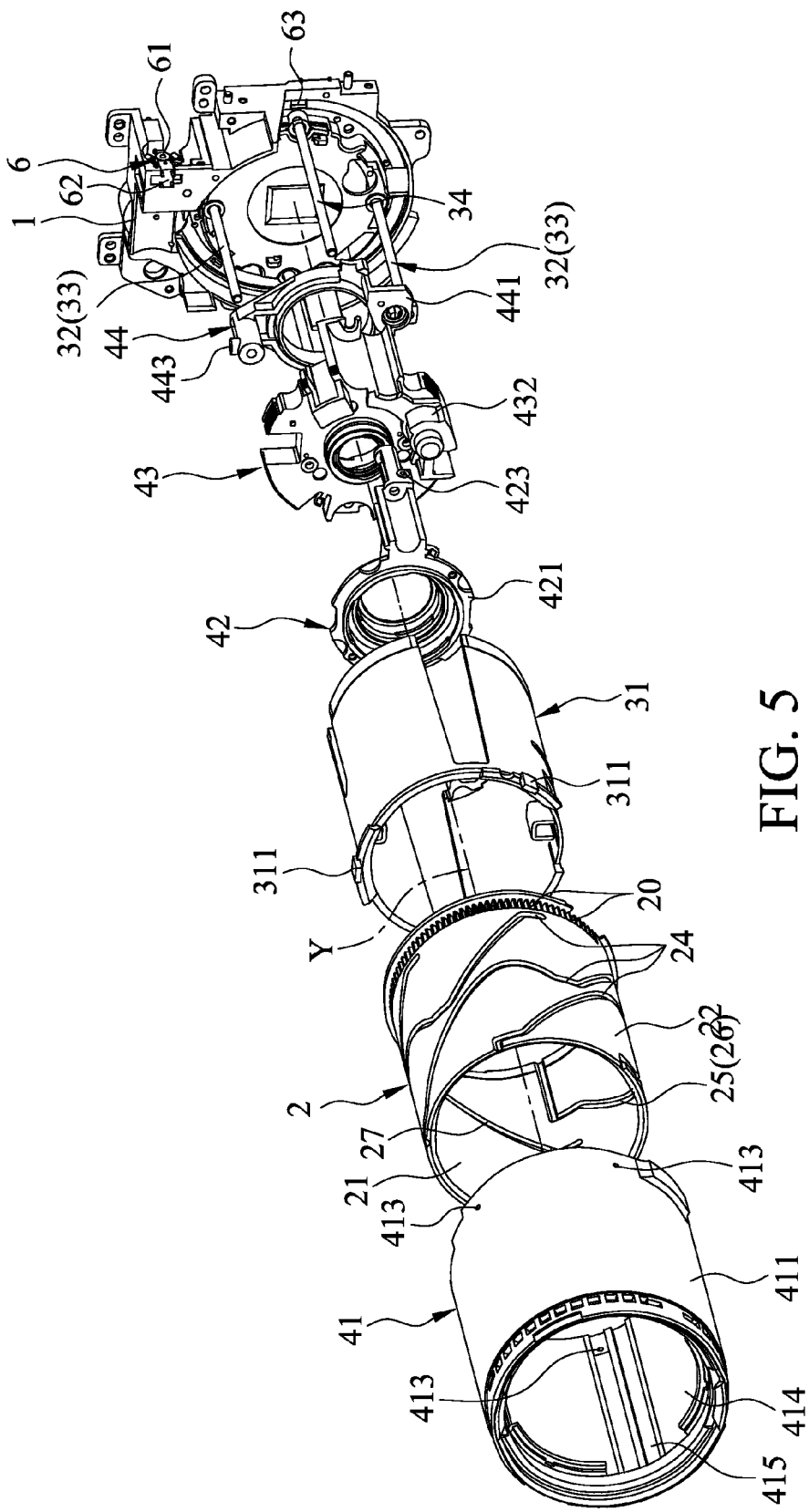
FIG. 5 is an exploded perspective view of the components of the preferred embodiment of the zoom lens of the invention.
Figure 7:
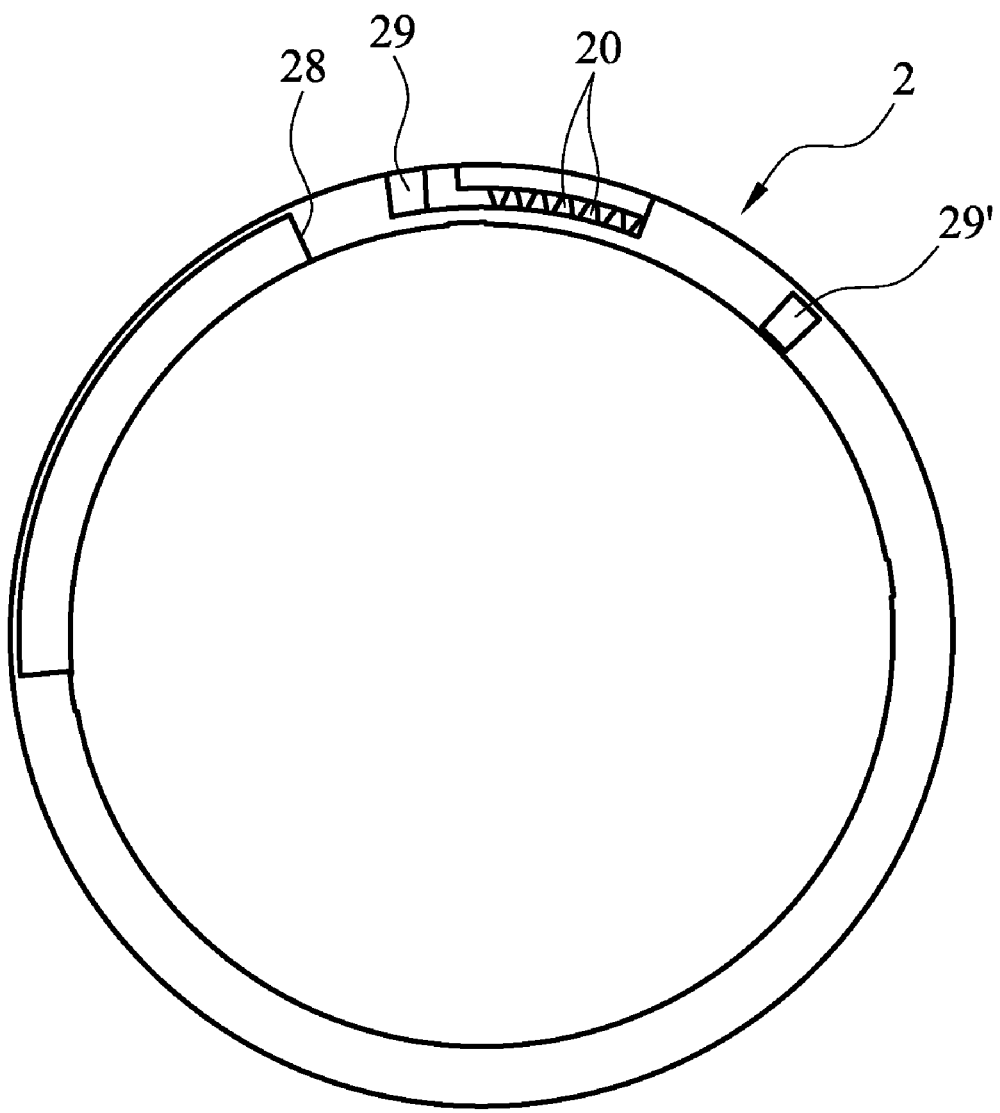
FIG. 7 is a bottom view of configuration of a bottom of a cam roll.

Referring to FIGS. 5 and 7, the cam roll 2, which is rotatable about an optical axis Y at an original position thereof and disposed on the base 1, comprises an inner circumferential surface 21, an outer circumferential surface 22, a supporting surface 23, three first cam grooves 24, a second cam groove 25, a third cam groove 26, a fourth cam groove 27, a datum point 28, a first skew point 29, a second skew point 29', and a plurality of tooth portions 20. The outer circumferential surface 22 encloses the inner circumferential surface 21. The supporting surface 23 is disposed along the direction of the optical axis Y and faces to the base 1. The three first cam grooves 24 are recessed on the outer circumferential surface 22. The second cam groove 25 is recessed on the inner circumferential surface 21. The datum point 28 is disposed on the supporting surface 23 along a circular direction. The plurality of tooth portions 20 are disposed on the outer circumferential surface 22 along the circular direction. The datum point 28 of the cam roll 2 corresponds to the zeroing status of the plurality of lens groups 41, 42, 43 and 44. Positions of the first and second skew points 29 and 29' are configured as a first skewing status and a second skewing status which are corresponding to a duration between the macro shooting-distance status and the wide shooting-distance status of the plurality of lens groups 41, 42, 43 and 44, wherein the second skewing status is in between the first skewing status and the wide shooting-distance status. In this embodiment, the datum point 28, the first skew point 29 and the second skew point 29' are reflective lenses, and the second cam groove 25 and the third cam groove 26 are referred to as the same cam groove.

Figure 6:
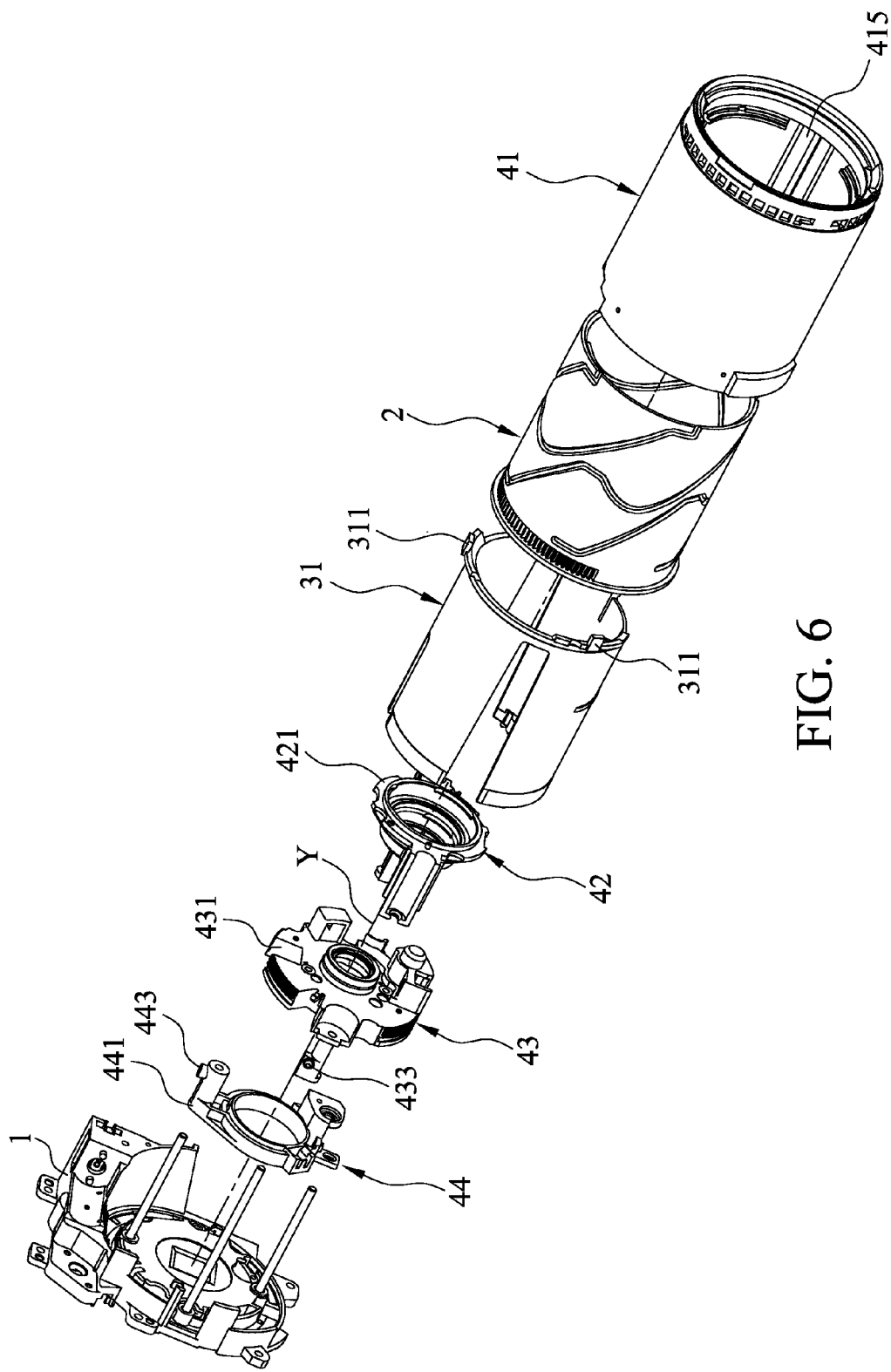
FIG. 6 is an exploded perspective view of configuration of a third linked pin of the invention.
Figure 10:
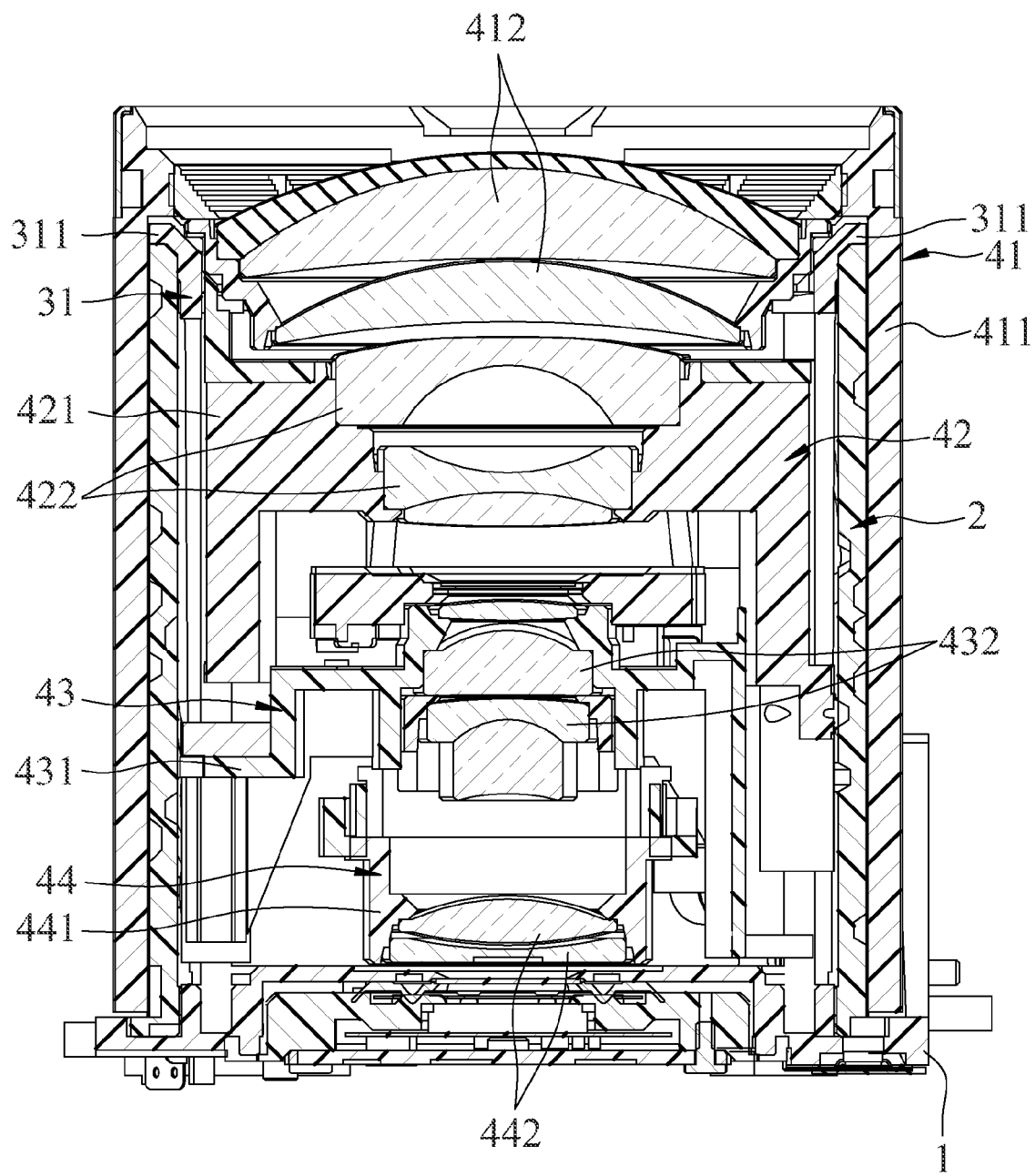
FIG. 10 is a sectional view showing a lens situated in a receiving status.
Figure 11:
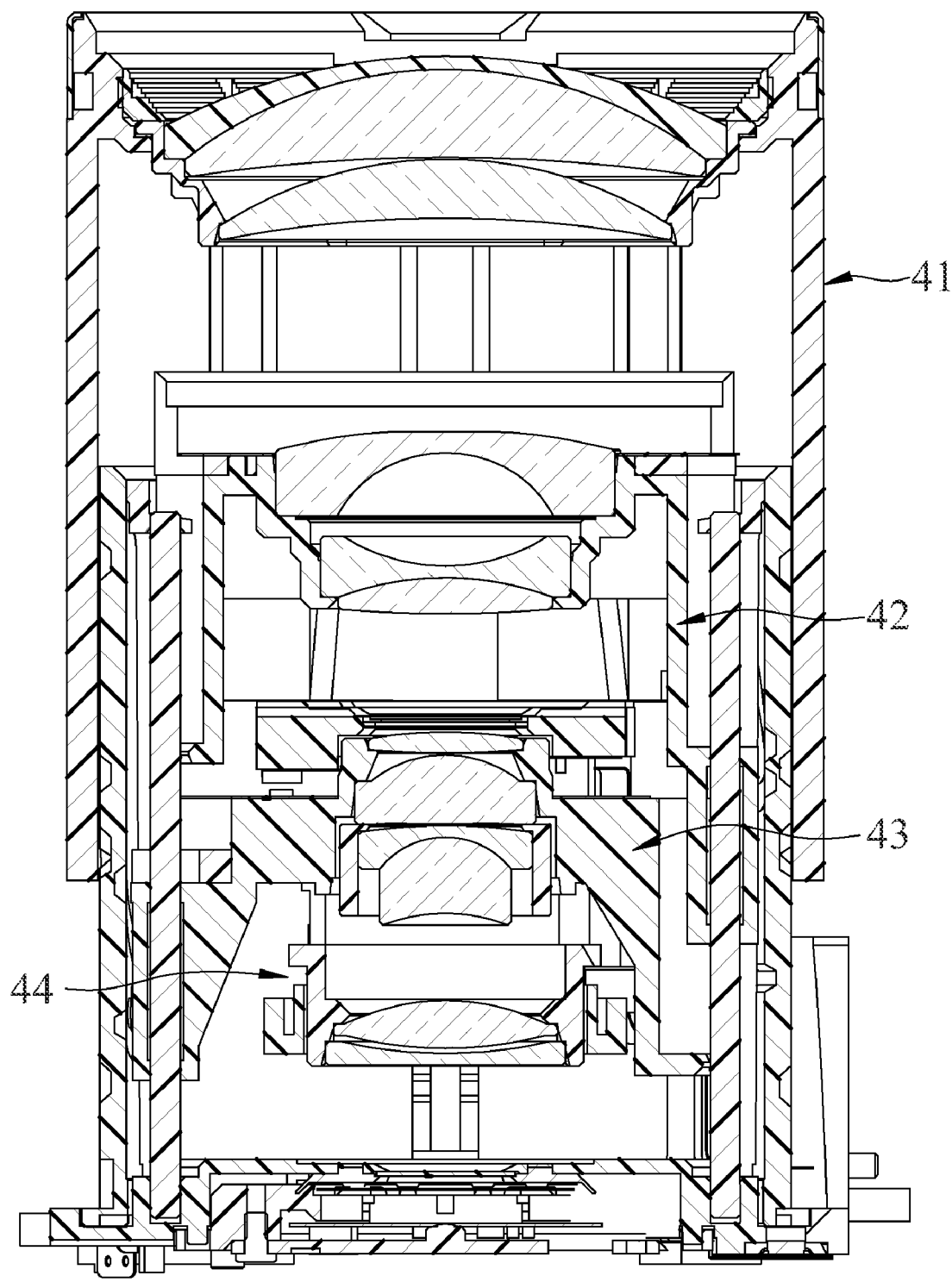
FIG. 11 is a sectional view showing a lens situated in a zeroing status.
Figure 12:
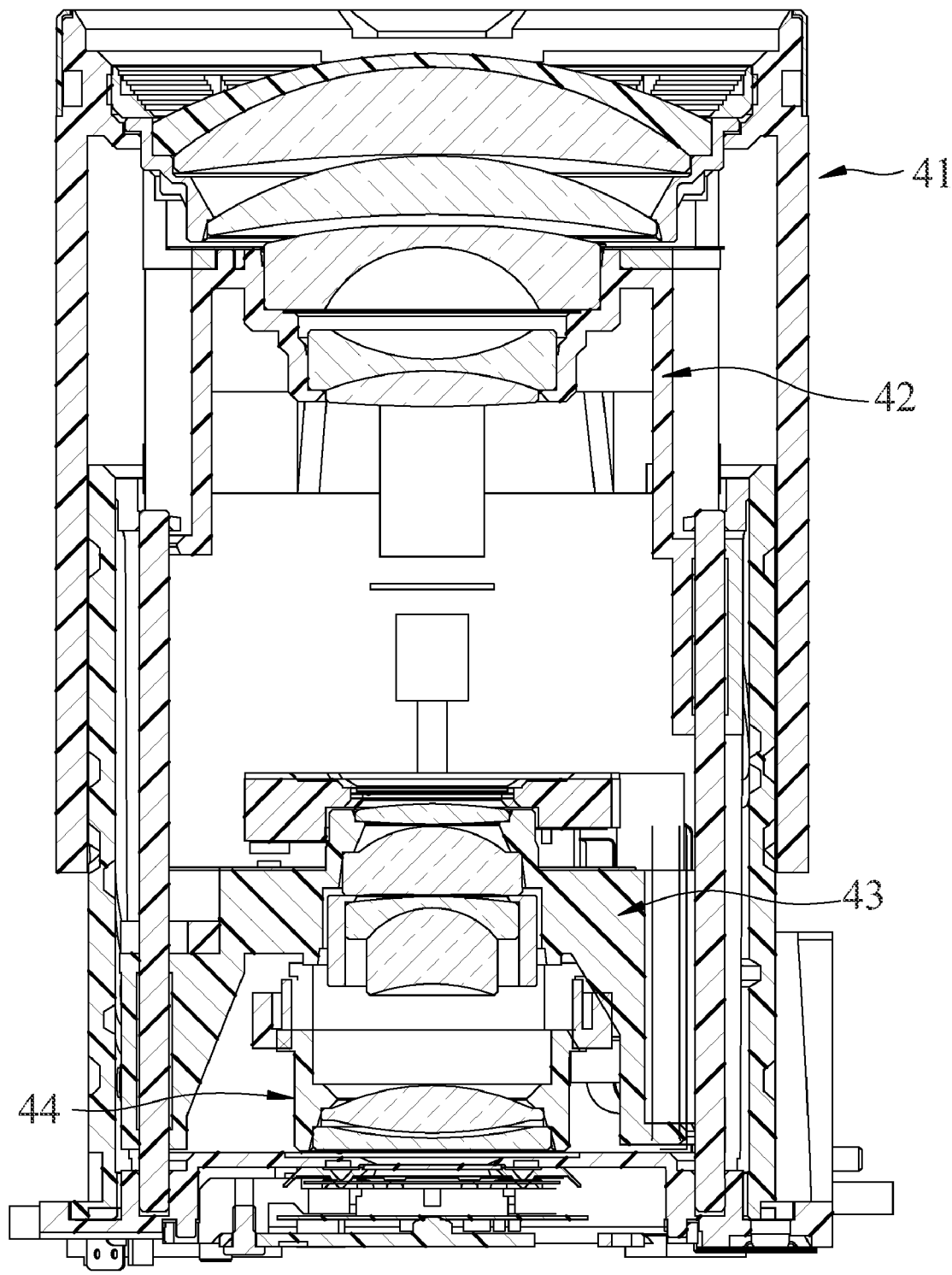
FIG. 12 is a sectional view showing a lens situated in a macro shooting-distance status.
Figure 13:
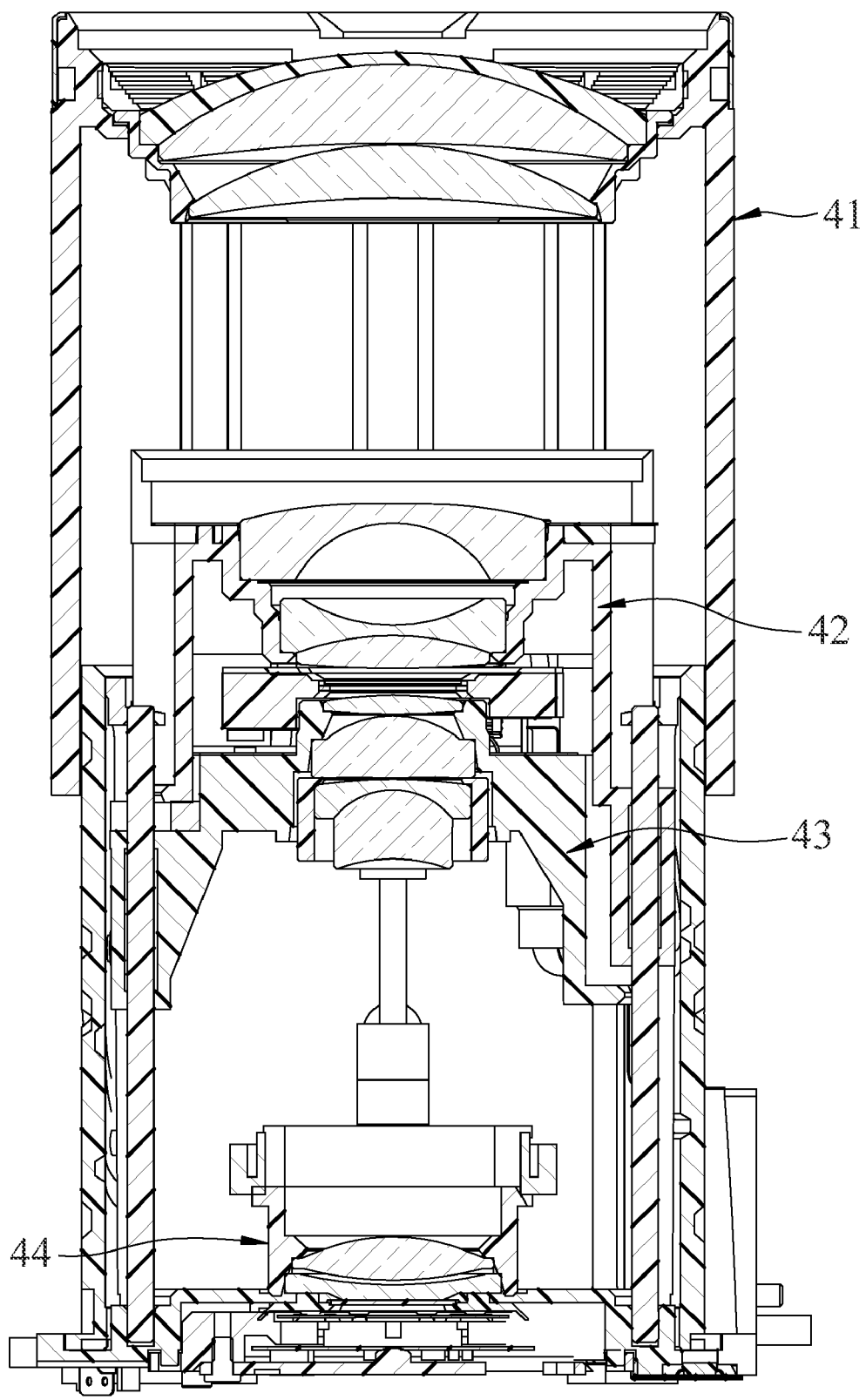
FIG. 13 is a sectional view showing a lens situated in a wide shooting-distance status.

Referring to FIGS. 5, 6 and 10, the plurality of straight-forward units 31, 32, 33 and 34 are respectively parallel to the optical axis Y to be fixed at the base 1 and defined as a first, second, third and fourth straight-forward units 31, 32, 33 and 34. The first straight-forward unit 31 is cylindrical and comprises a plurality of radially extended guide blocks 311. The second straight-forward unit 32, the third straight-forward unit 33 and the fourth straight-forward unit 34 are guide posts correspondingly inserted on the base 1. In this embodiment, the second straight-forward unit 32 and the third straight-forward unit 33 are referred to as the same guide post.

The plurality of lens groups 41, 42, 43 and 44 are defined as a first, second, third and fourth lens groups, respectively. The first, second, third and fourth lens groups 41, 42, 43 and 44, respectively jacketed on the first, second, third and fourth straight-forward units 31, 32, 33 and 34, are driven by one of the first cam grooves 24, the second cam groove 25, the third cam groove 26, the fourth cam groove 27 of the cam roll 2, respectively. The first lens group 41 comprises a group box 411, movable along a direction of the optical axis Y and a plurality of lenses 412 securely disposed on the group box 411. The group box 411 of the first lens group 41, cylindrically formed and jacketed on the cam roll 2, comprises a plurality of pins 413 which are slidably connected to the first cam groove 24 respectively and a plurality of straight-forward grooves 415 which are formed on an inner circumferential surface 21 of the cam roll 2 and slidably connected to the plurality of radially extended guide blocks 311 of the first straight-forward unit 31. The second lens group 42 comprises a group box 421, movable along the direction of the optical axis Y, a lens 422 securely disposed on the group box 421, and a linked pin 423. The third lens group 43 comprises a group box 431, movable along the direction of the optical axis Y, a lens 432 securely disposed on the group box 431, and a linked pin 433. The fourth lens group 44 comprises a group box 441, movable along the direction of the optical axis Y, a lens 442 securely disposed on the group box 441, and a linked pin 443. The group box 421 of the second lens group 42, the group box 431 of the third lens group 43 and the group box 441 of the fourth lens group 44 are jacketed on the second straight-forward unit 32, the third straight-forward unit 33 and the fourth straight-forward unit 34, respectively. The linked pin 423 of the second lens group 42, the linked pin 433 of the third lens group 43 and the linked pin 443 of the fourth lens group 44 are slidably connected to a second cam groove 25 recessed on the inner circumferential surface 21, a third cam groove 26, a fourth cam groove 27, respectively. It is noted that the amount of the plurality of lenses 412 of the first lens group 41, the lens 422 of the second lens group 42, the lens 432 of the third lens group 43, and the lens 442 of the fourth lens group 44 can be adjusted according to the optical characteristics required by the zoom lens. For example, the amount of the plurality of lenses 412 of the first lens group 41, the lens 422 of the second lens group 42, the lens 432 of the third lens group 43, and the lens 442 of the fourth lens group 44 can be set as one, two or five.

Figure 4:
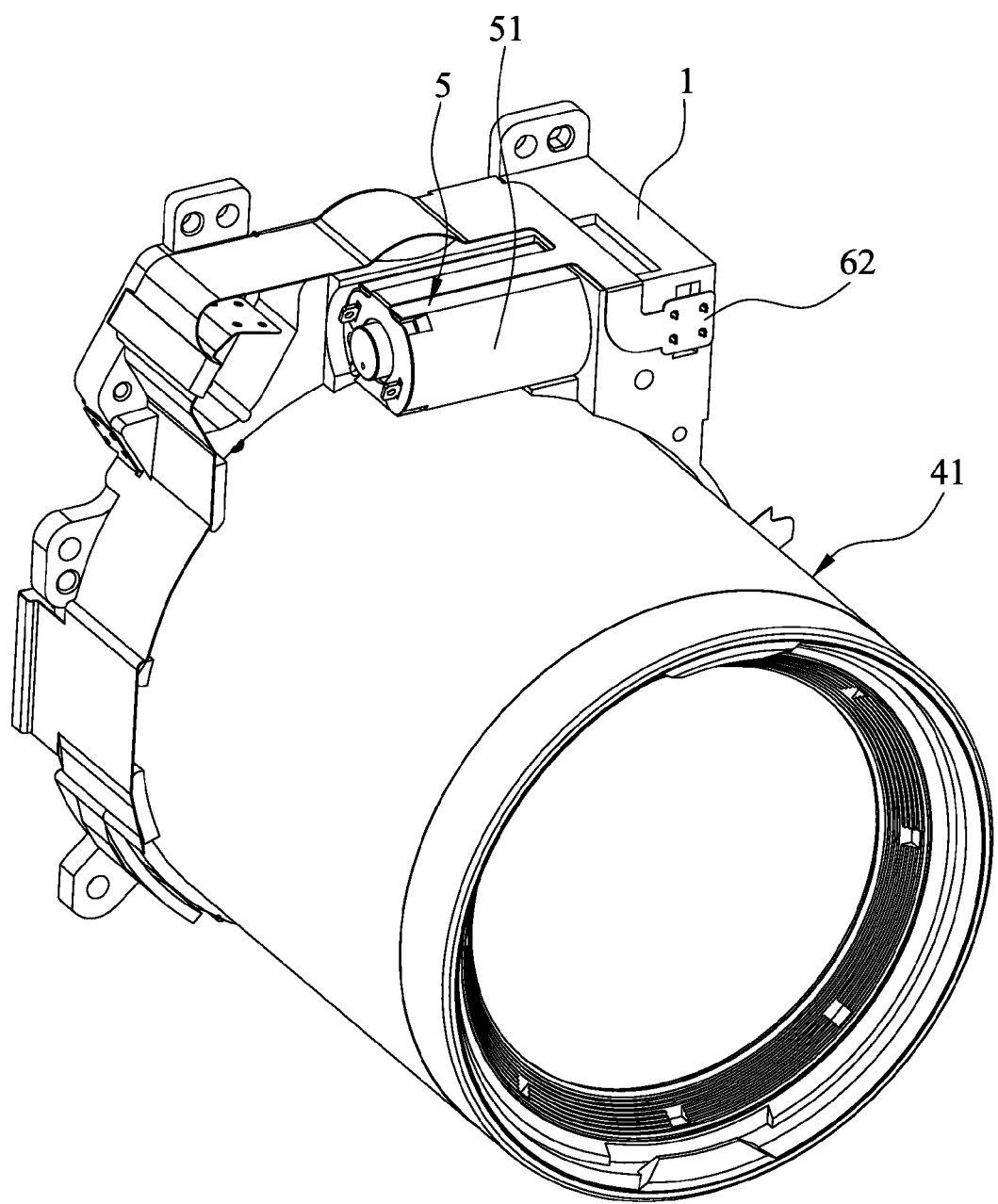
FIG. 4 is a perspective view of a preferred embodiment of a zoom lens having increased positioning accuracy of the invention.
Figure 8:
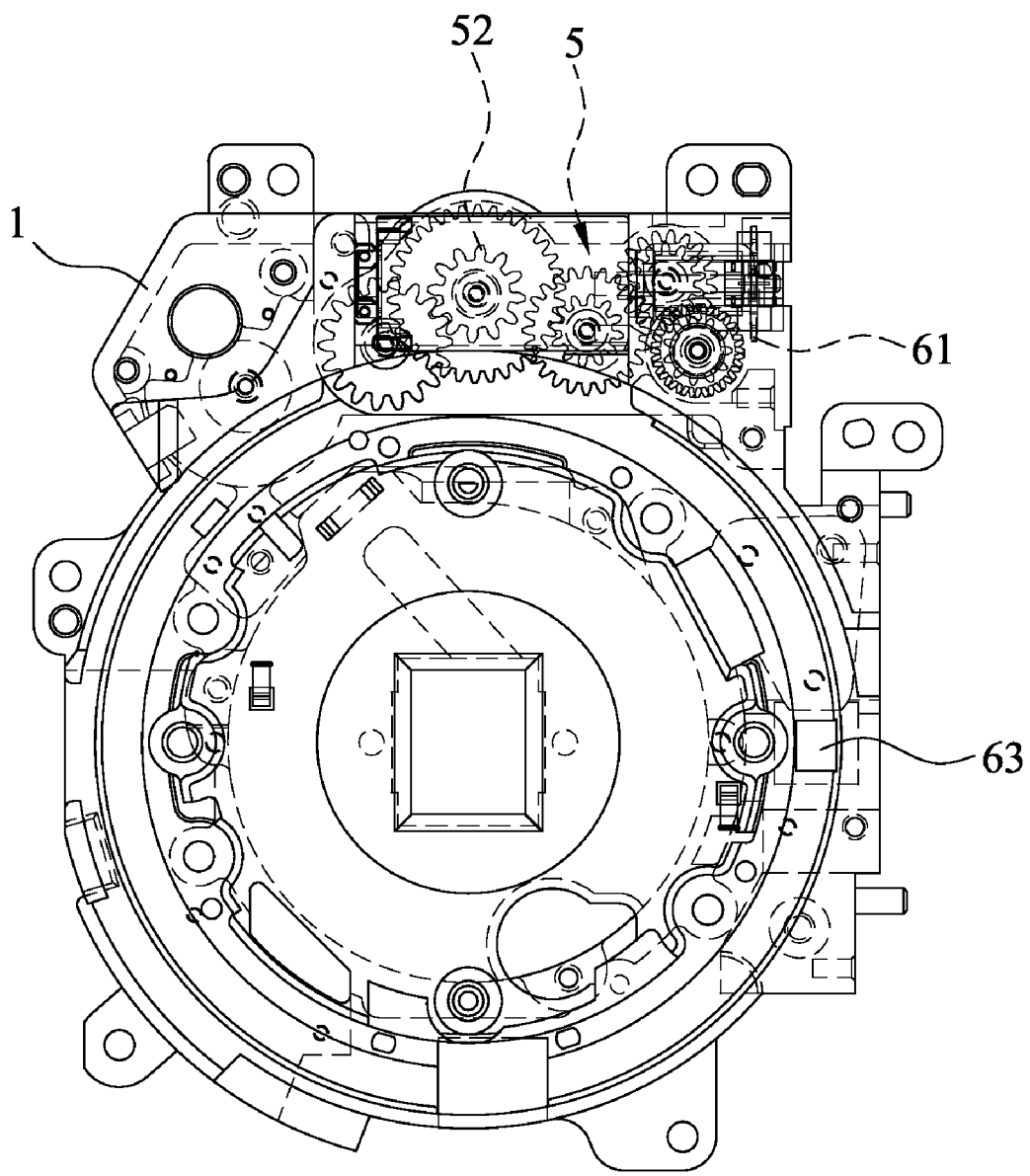
FIG. 8 is a top view of configuration of a decelerating system disposed on a base.

Referring to FIGS. 4, 5 and 8, the driving unit 5 installed on the base 1 comprises a driving portion 51 and a decelerating system 52 driven by the driving portion 51. The driving portion 51 drives the cam roll 2 to be rotatable at the original position thereof, so that the first, second, third and fourth lens groups 41, 42, 43 and 44 are reciprocally switched between the receiving status and the wide shooting-distance status. In this embodiment, the driving portion 51 is a motor, and the decelerating system 52 is a decelerating gear system.

Referring to FIGS. 5, 7 and 8, the detecting unit 6 disposed on the base 1 comprises an impeller 61 driven by the driving portion 51 of the driving unit 5, a detecting portion 62 utilized to detect the rotation of the impeller 61 with a rotation count, and a photonic sensor 63 utilized to detect the datum point 28 and the first skew point 29 and the second skew point 29' of the cam roll 2. In this embodiment, the photonic sensor 63 is a photo-reflective sensor.

Figure 9:
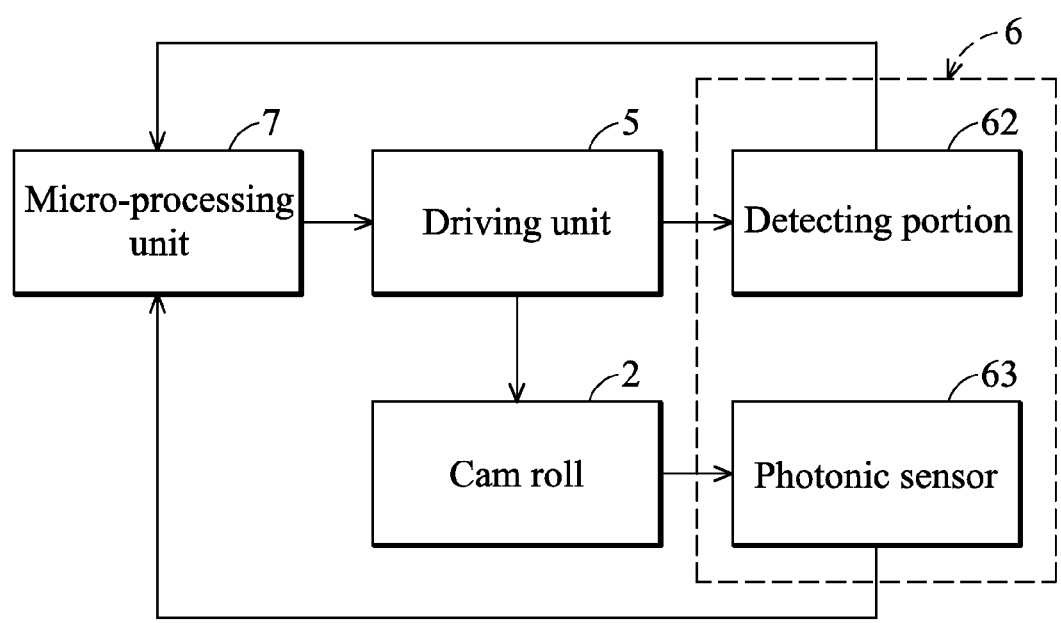
FIG. 9 is a block view showing the connection relationship of a micro-processing unit, a detecting portion and a photonic sensor of the invention.

Referring to FIGS. 5 and 9, the micro-processing unit 7 is electrically connected to the driving unit 5 and the detecting portion 62 and the photonic sensor 63 of the detecting unit 6.

Referring to FIGS. 5, 10, 11, 12 and 13, when the zoom lens is zoomed, the driving portion 51 drives the cam roll 2 to be rotatable at the original position thereof, so that a zooming process can be achieved when the first, second, third and fourth lens groups 41, 42, 43 and 44 are reciprocally switched between the receiving status and the wide shooting-distance status along the direction of the optical axis Y. A control signal for the driving unit 5 is originated from the micro-processing unit 7. A corresponding control signal is generated by the micro-processing unit 7 in response to an input of an operative key (not shown in FIGs.) of a camera.

Referring to FIGS. 5, 7 and 9, during the zooming process, when the first, second, third and fourth lens groups 41, 42, 43 and 44 are switched from the receiving status to the zeroing status and the datum point 28 of the cam roll 2 is detected by the photonic sensor 63 of the detecting unit 6, a signal emitting from the photonic sensor 63 of the detecting unit 6 is provided for the micro-processing unit 7 to determine the position of the datum point 28 of the cam roll 2 and to reset the rotation count of the impeller 61. When the cam roll 2 keeps rotating to cause the first, second, third and fourth lens groups 41, 42, 43 and 44 to switch from the zeroing status to the first skewing status, the photonic sensor 63 of the detecting unit 6 detects the first skew point 29 of the cam roll 2, and a skew signal emitting from the photonic sensor 63 of the detecting unit 6 is provided for the micro-processing unit 7 to determine whether the rotation count of the impeller 61 meets a first predetermined value or not. If the rotation count of the impeller 61 is not equal to the first predetermined value, the micro-processing unit 7 amends the rotation count of the impeller 61 to be equal to the first predetermined value. For example, based on the first predetermined value of the rotation count of the impeller 61 set as one hundred counts (100 counts), if the obtained rotation count of the impeller 61 is one hundred and two counts (102 counts) while switching the first, second, third and fourth lens groups 41, 42, 43 and 44 from the zeroing status to the first skewing status, the micro-processing unit 7 amends the rotation count of the impeller 61 to be equal to the first predetermined value, i.e., 100 counts. If the cam roll 2 keeps rotating to cause the first, second, third and fourth lens groups 41, 42, 43 and 44 to switch from the second skewing status to the first skewing status, the photonic sensor 63 of the detecting unit 6 detects the second skew point 29' of the cam roll 2, and therefore another skew signal emitting from the photonic sensor 63 of the detecting unit 6 is provided for the micro-processing unit 7 to determine whether the rotation count of the impeller 61 meets a second predetermined value or not.

If the rotation count of the impeller 61 is not equal to the second predetermined value, the micro-processing unit 7 amends the rotation count of the impeller 61 to be equal to the second predetermined value. For example, based on the second predetermined value of the rotation count of the impeller 61 which is set as one thousand counts (1000 counts), if the obtained rotation count of the impeller 61 is one thousand and twenty counts (1020 counts) while switching the first, second, third and fourth lens groups 41, 42, 43 and 44 from the zeroing status to the first skewing status, the micro-processing unit 7 amends the rotation count of the impeller 61 to be equal to the second predetermined value, i.e., 1000 counts.

Likewise, during the zooming process of the first, second, third and fourth lens groups 41, 42, 43 and 44, these lens groups 41, 42, 43 and 44 is moved toward another direction for zooming, i.e., the direction from the wide shooting-distance status toward the receiving status. When the datum point 28 of the cam roll 2 and the first and second skew points 29 and 29' are detected by the photonic sensor 63 of the detecting unit 6, the micro-processing unit 7 likewise determines the position of the datum point 28 of the cam roll 2 and resets or amend the rotation count of the impeller 61.

Note that the photonic sensor 63 of the detecting unit 6 can be an opto-interrupt sensor, as long as the datum point 28 of the cam roll 2 and the first and second skew points 29 and 29' are datum point types, such as blades, capable of being sensed by the opto-interrupt sensor. Therefore, signals utilized for the determination of the micro-processing unit 7 can be equally provided by the opto-interrupt sensor.

Based on the description above, with the detection of the first and second skew points 29 and 29' by the photonic sensor 63 of the detecting unit 6, the signal emitted from the photonic sensor 63 of the detecting unit 6 can be provided for the micro-processing unit 7 to detect the real mechanism position of the first, second, third and fourth lens groups 41, 42, 43 and 44 and to determine whether the rotation count of the impeller 61 is correct or not, and/or is required to be amended or not. Compared to the conventional micro-processing unit 93 which utilizes the rotation count of the impeller 911 to calculate the extended position of the lens 8 after the zeroing position is determined, it can be asserted that the possibility of accurate positioning position of the first, second, third and fourth lens groups 41, 42, 43 and 44 affected by an error rotation count of the impeller 61 can be prevented when the first, second, third and fourth lens groups 41, 42, 43 and 44 are reciprocally switched between the receiving status and the wide shooting-distance status. The installation of the skew points according to embodiments of the invention, the rotation count of the impeller can be skewed and amended by the micro-processing unit during the zooming process of the lens, thereby assuring accurate movement of the lens groups to correct positions, thus increasing positioning accuracy.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A zoom lens, comprising:
   a base;

a cam roll being defined with an original position, rotated about an optical axis at the original position and disposed on the base, comprising a plurality of cam grooves, a datum point disposed along a circular direction, and at least one skew point;

a plurality of straight-forward units being respectively parallel to the optical axis and fixed at the base;

a plurality of lens groups moved by the cam roll to sequentially vary from a receiving status to a zeroing status, a macro shooting-distance status and a wide shooting-distance status, each of the plurality of lens groups being jacketed on one of the plurality of straight-forward units and driven by one of the plurality of cam grooves of the cam roll and comprising a group box movable along a direction of the optical axis and at least one lens securely disposed on the group box, wherein the datum point of the cam roll corresponds to the zeroing status of the plurality of lens groups, and a position of the skew point is configured as a skewing status corresponding to a duration between the macro shooting-distance status and the wide shooting-distance status of the plurality of lens groups;

a driving unit installed on the base, comprising a driving portion and a decelerating system driven by the driving portion, wherein the driving portion drives the cam roll to be rotatable at the original position so that the plurality of lens groups are reciprocally switched between the receiving status and the wide shooting-distance status;

a detecting unit disposed on the base, comprising an impeller driven by the driving portion of the driving unit, a detecting portion utilized to detect the rotation of the impeller with a rotation count, and a photonic sensor utilized to detect the datum point and the at least one skew point of the cam roll; and a micro-processing unit electrically connected to the driving unit and the detecting portion and the photonic sensor of the detecting unit;

when the photonic sensor of the detecting unit detects the datum point of the cam roll, a signal emitted from the photonic sensor of the detecting unit is provided for the micro-processing unit to determine the position of the datum point of the cam roll and zero the rotation count of the impeller; and when the photonic sensor of the detecting unit detects the at least one skew point of the cam roll, a skew signal emitted from the photonic sensor of the detecting unit is provided for the micro-processing unit to determine whether the rotation count of the impeller meets a predetermined value or not, and the micro-processing unit amends the rotation count of the impeller to be equal to the predetermined value if the rotation count of the impeller is not equal to the predetermined value.

2. The zoom lens as claimed in claim 1, wherein the cam roll further comprises a supporting surface disposed along the direction of the optical axis and facing to the base, the datum point and the at least one skew point of the cam roll comprises reflecting sheets disposed on the supporting surface of the cam roll, and the photonic sensor of the detecting unit comprises a photo-reflective sensor.

3. The zoom lens as claimed in claim 2, wherein the cam roll comprises two skew points, the positions of the skew points are configured as a first skewing status and a second skewing status corresponding to a duration between the macro shooting-distance status and the wide shooting-distance status of the plurality of lens groups, and the second skewing status is located between the first skewing status and the wide shooting-distance status.

4. The zoom lens as claimed in claim 3, wherein an optical zooming rate of the zoom lens is not less than 12 times.

5. The zoom lens as claimed in claim 1, wherein the cam roll further comprises an outer circumferential surface and a plurality of tooth portions disposed on the outer circumferential surface along the circular direction, and the decelerating system of the driving unit comprises a decelerating gear system engaged with the plurality of tooth portions of the cam roll.

6. The zoom lens as claimed in claim 5, wherein the plurality of straight-forward units comprises a first straight-forward unit, a second straight-forward unit, a third straight-forward unit and a fourth straight-forward unit, the plurality of lens groups comprises a first lens group, a second lens group, a third lens group and a fourth lens group which are disposed along the direction of the optical axis and faced to the base, and the plurality of cam grooves of the cam roll comprises a first cam groove, a second cam groove, a third cam groove and a fourth cam groove.

7. The zoom lens as claimed in claim 6, wherein the first cam groove is recessed on the outer circumferential surface, the first straight-forward unit is cylindrical and comprises a plurality of radially extended guide blocks, the group box of the first lens group is cylindrical and jacketed on the cam roll, and the group box of the first lens group comprises a plurality of pins slidably connected to the first cam groove respectively and a plurality of straight-forward grooves formed on an inner circumferential surface of the cam roll and slidably connected to the plurality of radially extended guide blocks of the first straight-forward unit.

8. The zoom lens as claimed in claim 7, wherein the second cam groove, the third cam groove and the fourth cam groove are formed on the inner circumferential surface of the cam roll, and the second straight-forward unit, the third straight-forward unit and the fourth straight-forward unit comprise a plurality of guide posts inserted on the base.

9. The zoom lens as claimed in claim 8, wherein the group box of the second lens group is jacketed on the second straight-forward unit and slidably connected to the second cam groove.

10. The zoom lens as claimed in claim 9, wherein the group box of the third lens group is jacketed on the third straight-forward unit and slidably connected to the third cam groove.

11. The zoom lens as claimed in claim 10, wherein the group box of the second lens group and the group box of the third lens group are jacketed on the same straight-forward unit and slidably connected to the same straight-forward groove formed on the inner circumferential surface of the cam roll.

12. The zoom lens as claimed in claim 10, wherein the group box of the fourth lens group is jacketed on the fourth straight-forward unit and slidably connected to the fourth cam groove.

* * * * *